United States Patent [19]

Tanaka

[11] Patent Number: 5,129,736
[45] Date of Patent: Jul. 14, 1992

[54] INDEFINITE LINEAR MOTION GUIDE UNIT HAVING FOUR ENDLESS CIRCULATING PATHS

[75] Inventor: Kazuhiko Tanaka, Fuchu, Japan
[73] Assignee: Nippon Thompson Co., Ltd., Japan
[21] Appl. No.: 774,027
[22] Filed: Oct. 9, 1991
[30] Foreign Application Priority Data Oct. 9, 1990 [JP] Japan .................. 2-106311

[51] Int. Cl.⁵ .............................................. F16C 29/06
[52] U.S. Cl. ................................... 384/45; 384/44
[58] Field of Search ................ 384/43, 44, 45, 48

[56] References Cited

U.S. PATENT DOCUMENTS

| | | | |
|---|---|---|---|
| 4,563,045 | 1/1986 | Katayama | 384/44 |
| 4,799,804 | 1/1989 | Tanaka | 384/44 |
| 4,799,805 | 1/1989 | Tanaka | 384/44 |
| 4,902,143 | 2/1990 | Morita | 384/45 X |
| 4,941,197 | 7/1990 | Roeser | 384/44 |

*Primary Examiner*—Thomas R. Hannon
*Attorney, Agent, or Firm*—Skjerven, Morrill, MacPherson, Franklin & Friel

[57] ABSTRACT

An indefinite linear motion rolling contact guide unit generally includes a rail, a slider and a plurality of rolling members interposed between the rail and the slider. The rail includes a pair of inner upper and lower guide surfaces at each side. The slider includes a horizontal section and a pair of vertical sections each at each side of the horizontal section and each of the vertical sections is provided with a pair of first and second endless circulating paths, each of which includes a load path section, a return path section and a pair of curved connecting path sections. The return path section of the second endless circulating path is located higher in level and further away from the center line of the guide unit than the return path section of the first endless circulating path to thereby allow to provide a mounting hole between the return path section of the second endless circulating path and an inner side surface of the vertical section.

10 Claims, 5 Drawing Sheets

INDEFINITE LINEAR MOTION GUIDE UNIT HAVING FOUR ENDLESS CIRCULATING PATHS

BACKGROUND OF THE INVENTION

1. Field of the Invention

This invention generally relates to a linear motion guide unit, and, in particular, to an indefinite linear motion guide unit suitable for use in guiding a linear motion over an extended distance. The present invention is particularly suited for use as a component of a driving unit in various precision processing machines, testing equipment or the like.

2. Description of the Prior Art

An indefinite linear motion guide unit having four endless circulating paths is well known as disclosed in the Japanese Patent Laid-open Pub. No. Hei 1-175564. The linear motion guide unit disclosed in this publication is illustrated in FIGS. 5 and 6 herein and it generally includes a rail, a slider and a plurality of rolling members interposed between the rail and the slider. The rail includes on each side a pair of upper and lower inner guide surfaces which are inclined at opposite directions. The slider includes a slider main body H which in turn includes a horizontal section H and a pair of vertical sections each depending from the horizontal section H and each defined by combining three blocks E, F and G together by a bolt. The vertical section is fixedly attached to the horizontal section H by means of a bolt I.

In the vertical section defined by a combination of the three blocks E, F and G, a pair of endless circulating paths C and D are formed, and the paths C and D are filled with a plurality of rollers A and B, respectively. Each of the endless circulating paths C and D has a load path section, which defines an outer guide surface opposite to a corresponding one of the inner guide surfaces of the rail, a return path section, which runs in parallel with the load path section, and a pair of curved connecting path sections connecting the corresponding ends of the load and return path sections, as well known in the art.

In the above-described structure, since a plurality of mounting bolts I are used along each side of the horizontal section of the slider main body H, difficulty is encountered in mounting a slider table on the slider main body H. Under the circumstances, in order to allow to mount a slider table on top, there must be provided a slider main body J having an extended width W1 as shown in FIG. 6. In the structure shown in FIG. 6, a mounting hole K may be provided in the slider main body J as offset in position from the endless circulating paths C and D, so that a slider table may be fixedly mounted on the slider main body J. In this case, however, the center-to-center distance W2 between the two corresponding mounting holes K in the slider main body J also becomes larger. As a result, a slider table to be mounted on this slider main body J necessarily becomes larger. Accordingly, the overall size of the slider main unit J and thus that of the guide unit tends to become larger.

As shown in FIG. 6, as well known in the art, an end block (not shown) is fixedly attached to each end of the slider main body J and an end seal L is fixedly attached to each of the end blocks by means of bolts M.

SUMMARY OF THE INVENTION

In accordance with the present invention, there is provided a linear motion guide unit including a rail, a slider having four endless circulating paths, and a plurality of rolling members provided in each of the four endless circulating paths. The rail is provided with a pair of upper and lower inner guide surfaces which are inclined at opposite directions. In a preferred embodiment, the upper inner guide surface is inclined to face downward obliquely and the upper inner guide surface is inclined to face upward obliquely.

The slider includes a horizontal section and a pair of vertical sections depending from the horizontal section, and each of the vertical sections is formed with a pair of endless circulating paths. Each of the four endless circulating paths includes a load path section, which defines one of a pair of upper and lower outer guide surfaces located opposite to a corresponding one of the pair of upper and lower inner guide surfaces, a return path section, which runs in parallel with the load path section, and a pair of curved connecting path sections connecting corresponding ends of the load and return path sections. Because of an inclined arrangement, if one of the endless circulating paths includes an upper outer guide surface as its load path section, it includes a lower return path section; whereas, if it includes a lower outer guide surface as its load path section, it then includes an upper return path section.

In accordance with the present invention, the upper return path section is located further away from the lower return path section sideways. With this structure, a mounting hole for mounting a slider table may be provided between the inner surface of a vertical section of the upper return path. With this structure, the size of the slider table and thus the overall size of the present linear motion guide unit can be minimized.

In a preferred embodiment, the slider includes a slider main body and a pair of end blocks fixedly attached to each end of the slider main body. The slider also includes a slider table which is fixedly mounted on the slider main body. The slider main body includes a horizontal section and a pair of vertical sections which are integral in structure with the horizontal section and which depend from respective sides of the horizontal section. The load path section is defined as an outer guide surface formed at an inner surface of the vertical section of the slider main body and the return path section is also formed in the vertical section. In a preferred embodiment, the return path section is defined by inserting a sleeve having a predetermined cross sectional shape into a hole formed in the vertical section. The curved connecting path sections are formed in each of the end blocks.

It is therefore a primary object of the present invention to obviate the disadvantages of the prior art as described above and to provide an improved linear motion guide unit.

Another object of the present invention is to provide an improved linear motion guide unit having four endless circulating paths and yet compact in size.

A further object of the present invention is to provide an improved linear motion guide unit high in accuracy, large in load bearing capability and yet compact in size.

Other objects, advantages and novel features of the present invention will become apparent from the following detailed description of the invention when considered in conjunction with the accompanying drawings.

DESCRIPTION OF THE PREFERRED EMBODIMENTS

Figure 1:
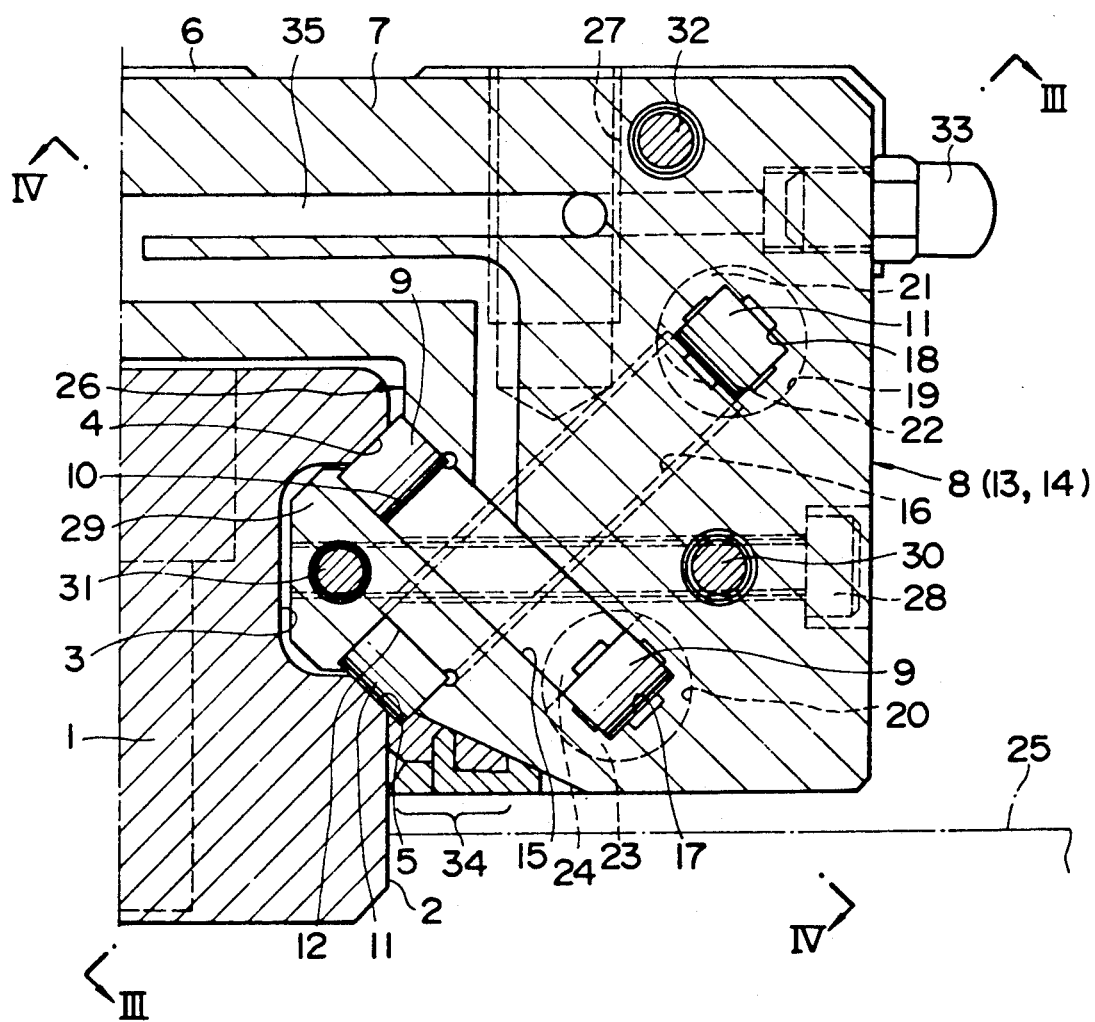
FIG. 1 is a schematic illustration showing in cross section a linear motion guide unit constructed in accordance with one embodiment of the present invention.

Referring now to FIGS. 1 through 4, a linear motion guide unit constructed in accordance with one embodiment of the present invention will be described. The present linear motion guide unit generally includes a rail 1, a slider and a plurality of rollers 9 and 11 as rolling members. The rail 1 is extended straight over a desired length and it is formed on each side with a guide groove 3 to thereby define a pair of inner upper and lower guide surfaces 4 and 5. The upper guide surface 4 is inclined with respect to a vertical line to face downward obliquely. The lower guide surface 5 is also inclined with respect to a vertical line to face upward obliquely. In the illustrated embodiment, the upper and lower guide surfaces 4 and 5 are so inclined that their normal lines merge at 90 degrees. It is to be noted, however, that the angles of the respective upper and lower guide surfaces 4 and 5 may be set at any desired values.

Figure 2:
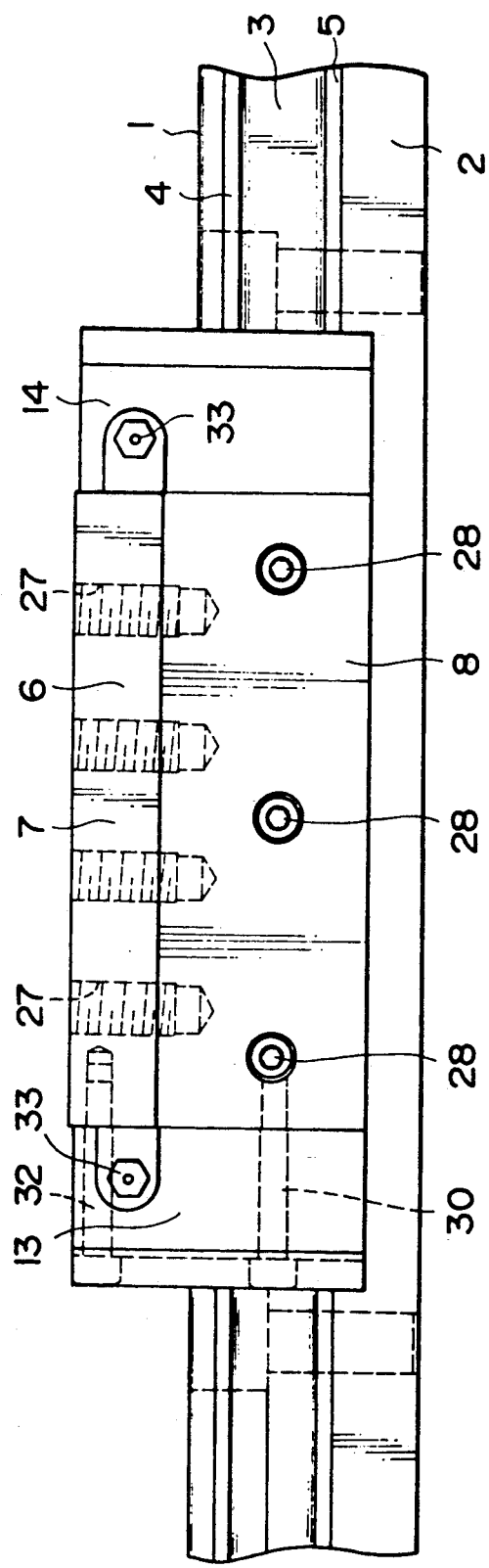
FIG. 2 is a schematic illustration showing in side elevation the guide unit shown in FIG. 1.

The slider generally includes a slider main body 6 and a pair of end blocks 13 an 14 fixedly attached to the front and rear ends of the slider main body 6. The slider also includes a slider table (not shown) which is to be fixedly mounted on the slider main body 6. The slider main body 6 in the illustrated embodiment has a generally U-shaped cross sectional shape and thus it includes a horizontal section 7 and a pair of vertical sections 8 each of which depends downward from a corresponding side of the horizontal section 7. Preferably, the horizontal and vertical sections 7 and 8 are integrally formed from the same material as shown in FIGS. 1 and 2. Each of the end blocks 13 and 14 also has a similarly U-shaped cross sectional shape and is integrally formed and thus it also includes a horizontal section and a vertical section. As a result, the slider as whole has a horizontal section and a pair of vertical sections to define a generally U-shaped cross sectional shape.

A pair of first and second endless circulating paths 15 and 16 is formed in a criss-cross manner in each of the pair of vertical sections of the slider as best shown in FIG. 1. Each of the first and second endless circulating paths 15 and 16 includes a load path section, which defines an outer guide surface opposite to a corresponding inner guide surface, a return path section, which runs basically in parallel with the load path section, and a pair of curved connecting path sections, which connect corresponding ends of the load and return path sections. For example, the first endless circulating path 15 includes a first load path section 10, which is also defined as an outer upper guide surface located opposite to the inner upper guide surface 4, a first return path section 17, which runs in parallel with the first load path section 10, and a pair of curved connecting path sections 15 connecting the corresponding ends of the first load and return path sections 10 and 17. Similarly, the second endless circulating path 16 includes a second load path section 12, which is also defined as an outer lower guide surface located opposite to the inner lower guide surface 5, a second return path section 18, which runs in parallel with the second load path section 12, and a pair of curved connecting path sections 16 connecting the corresponding ends of the second load and return path sections 12 and 18.

Figure 3:
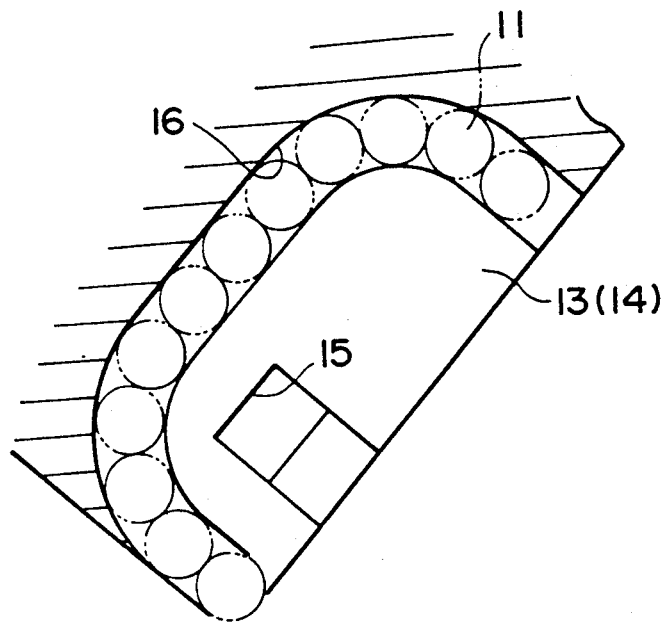
FIG. 3 is a schematic illustration taken along line III—III indicated in FIG. 1.
Figure 4:
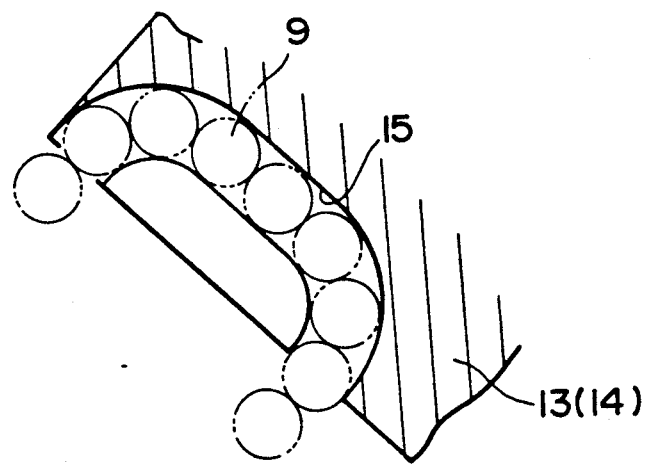
FIG. 4 is a schematic illustration taken along line IV—IV indicated in FIG. 1.
Figure 5:
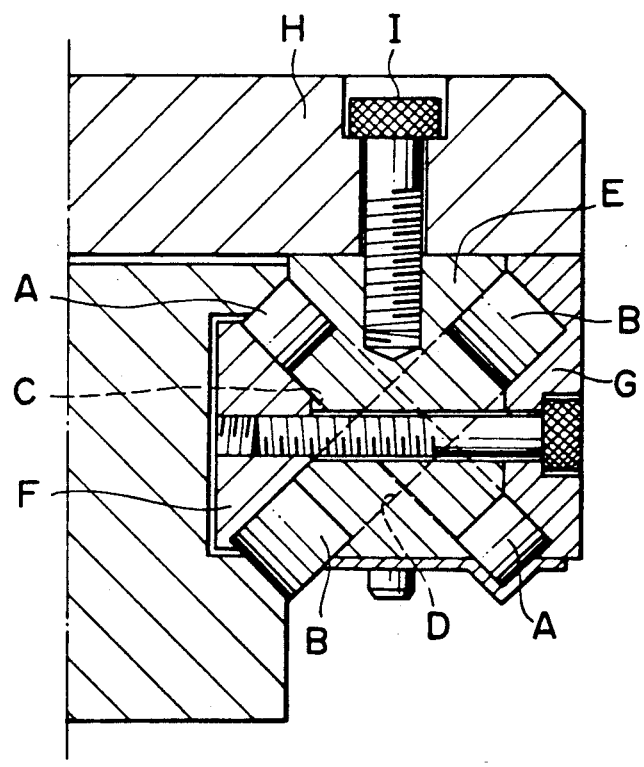
FIG. 5 is a schematic illustration showing in cross section a typical prior art linear motion guide unit having four endless circulating paths.
Figure 6:
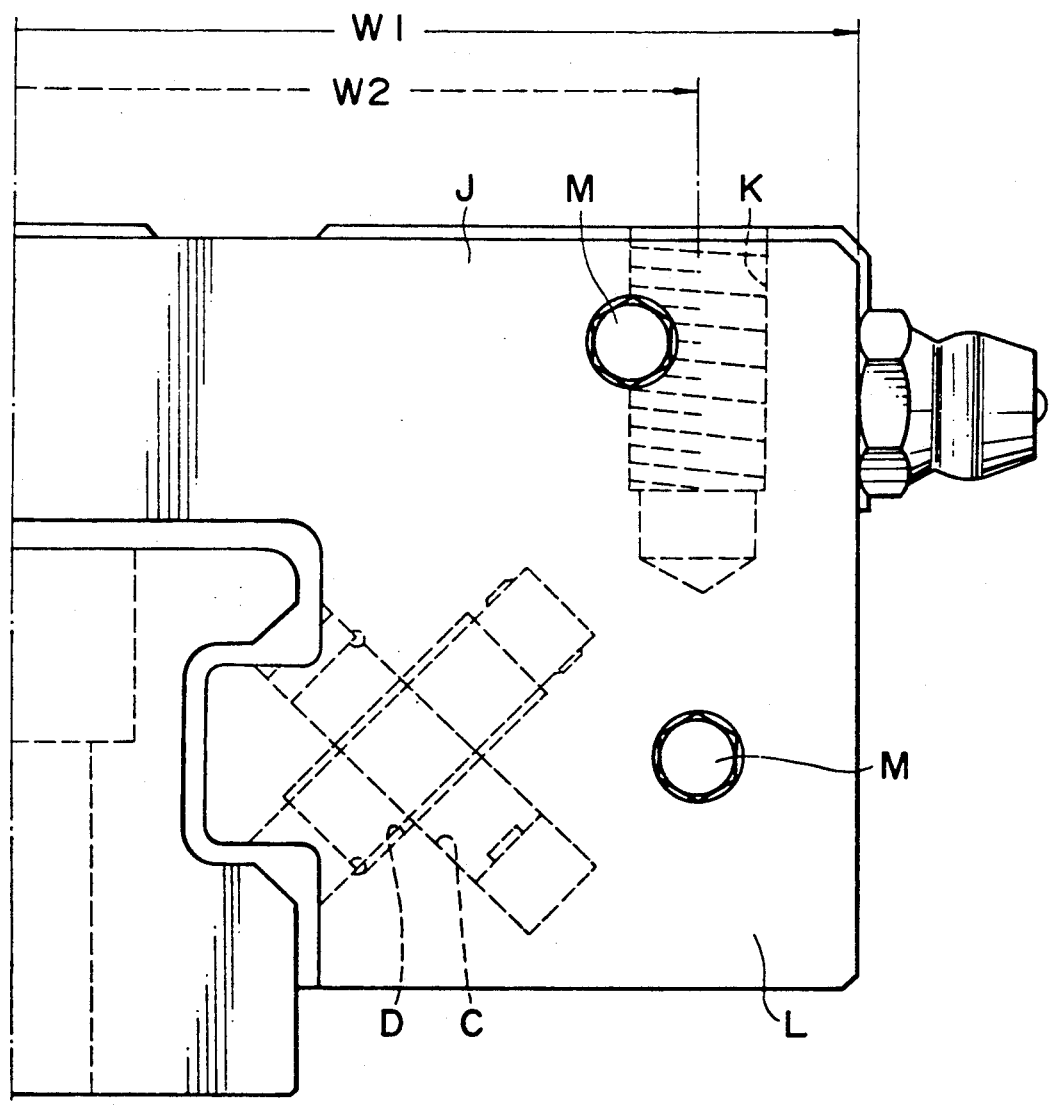
FIG. 6 is a schematic illustration showing in cross section another prior art linear motion guide unit having four endless circulating paths.

As may be best understood from FIGS. 3 and 4, the curved connecting path sections 15 and 16 are formed in each of the end blocks 13 and 14. The load and return path sections 10, 12, 17 and 18 are all formed in each of the vertical sections 8 of the slider main body 6.

In the illustrated embodiment, the first return path section 17 is defined by inserting a pair of sleeve components 23 and 24 into a first hole 20 formed in the vertical section 8 at its somewhat lower position. The sleeve components 23 and 24, when inserted into the first hole 20, define a split sleeve which in turn defines the first return path section 17 of the first endless circulating path. Similarly, the second return path section 18 is defined by inserting a pair of sleeve components 21 and 22 into a second hole 19 formed in the vertical section 8 at its somewhat upper position. Of importance, the second hole 19 is located not only above the first hole 20, but also to the right of the first hole 20 or at a location further away from the center of the guide unit in a horizontal direction. When inserted into the second hole, the sleeve components 21 and 22 define a split sleeve which in turn defines the second return path section 18 of the second endless circulating path.

A plurality of rollers 9 are provided in the first endless circulating path, and a plurality of rollers 11 are also provided in the second endless circulating path. Thus, those rollers 9 that are located in the load path section of the first endless circulating path provide a rolling contact between the paired inner and outer upper guide surfaces 4 and 10; similarly, those rollers 11 that are located in the load path section of the second endless circulating path provide a rolling contact between the paired inner and outer lower guide surfaces 5 and 12. The rollers 9 and 11 roll along the respective first and second endless circulating paths endlessly as the slider moves along the rail 1, so that theoretically the slider can move along the rail 1 indefinitely as long as the rail 1 extends.

The rail 1 is formed with a plurality of mounting holes spaced along its longitudinal axis and it is fixedly attached to a base 25 by means of bolts. The slider main body 6 is provided with a plurality of mounting holes 27 spaced apart from each other in a direction parallel with its longitudinal direction and along each side thereof. Of importance, since the second return path 18 of the second endless circulating path is located closer to the outer side surface of the slider main body 6, the mounting holes 27 may be located between the second return path 18 and an inner side surface 26 of the vertical section 8 of the slider main body 6. With this arrangement, a slider table (not shown) to be mounted on the slider main body 6 can also be minimized in size, in particular in its width. This is important since it can contribute in making the overall size of the linear motion guide unit compact in size.

Also shown in FIGS. 1 and 2 is a retainer member 29 for retaining the rollers 9 and 11 in position in the respective load path sections. The retainer member 29 is fixedly attached to the vertical section 8 by means of a bolt 28 which extends through the vertical section 8. Also as shown in FIGS. 1 and 2, each of the end blocks 13 and 14 is fixedly attached to the respective front and rear ends of the slider main body 6 by means of mounting bolts 30, 31 and 32. A grease nipple 33 is mounted on each of the end blocks 13 and 14 for providing grease to a desired location through a supply passage 35 formed therein. Also provided is a bottom seal member 34 which is fixedly attached to the bottom of the vertical section 8 so as to seal the bottom gap between the rail 1 and the vertical section 8.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
   a rail extending over a desired length, said rail including at each side a pair of inner upper and lower guide surfaces;
   a slider slidably mounted on said rail, said slider including a horizontal section and a pair of vertical sections each located at each side of said horizontal section, each of said vertical sections being formed with a pair of first and second endless circulating paths, said first endless circulating path including a first load path section defining an outer upper guide surface opposite to said inner upper guide surface, a first return path section located lower in height than and in parallel with said first load path section, and a pair of curved connecting path sections connecting corresponding ends of said first load and return path sections, said second endless circulating path including a second load path section defining a lower guide surface opposite to said inner lower guide surface, a second return path section located higher in height than and in parallel with said second load path section as well as further away from a center line of said guide unit than said first return path section, and a pair of curved connecting path sections connecting corresponding ends of said second load and return path sections; and
   a plurality of rolling members provided in each of the first and second endless circulating paths to thereby provide a sliding contact between said rail and said slider.

2. The guide unit of claim 1, wherein at least one mounting hole is provided in said slider in a location between an inner side surface of said vertical section and said second return path section of said second endless circulating path.

3. The guide unit of claim 2, wherein said slider includes a slider main body and a pair of end blocks which are fixedly mounted on a front end and a rear end of said slider main body, respectively, wherein said load and return path sections are formed in said vertical section and each of said pair of curved connecting path sections are formed in each of said end blocks.

4. The guide unit of claim 3, wherein said slider also includes a slider table to be mounted on said slider main body using said mounting hole.

5. The guide unit of claim 1, wherein said inner upper guide surface is inclined to face downward obliquely and said inner lower guide surface is inclined to face upwardly obliquely.

6. The guide unit of claim 5, wherein said outer upper guide surface is inclined to face upwardly obliquely in an opposed relationship with said inner upper guide surface to thereby define said first load path section, and said outer lower guide surface is inclined to face downwardly obliquely in an opposed relationship with said inner lower guide surface to thereby define said second load path section.

7. The guide unit of claim 6, wherein said first and second endless circulating paths are arranged to be in a criss cross manner when viewed in parallel with the longitudinal axis of said guide unit.

8. The guide unit of claim 1, wherein each of said first and second return path sections is defined by a sleeve member inserted in a return hole formed in said vertical section.

9. The guide unit of claim 8, wherein said sleeve member is comprised of a plurality of sleeve components which are inserted in said return hole to define said return path section.

10. The guide unit of claim 9, wherein said rolling members are rollers.

* * * * *